(12) United States Patent
Ayliffe et al.

(10) Patent No.: US 6,412,152 B1
(45) Date of Patent: Jul. 2, 2002

(54) CLIP

(75) Inventors: Harold Edward Ayliffe; Oliver Steffen, both of North Vancouver (CA)

(73) Assignee: G3 Genuine Guide Gear Inc., North Vancouver (CA)

( * ) Notice: Subject to any disclaimer, the term of this patent is extended or adjusted under 35 U.S.C. 154(b) by 0 days.

(21) Appl. No.: 09/654,041

(22) Filed: Sep. 1, 2000

(51) Int. Cl.$^7$ .......................... A44B 21/00; F16B 45/06
(52) U.S. Cl. ..................... 24/598.5; 24/499; 24/511; 24/598.1; 24/600.3
(58) Field of Search ..................... 24/598.5, 598.1, 24/599.1, 600.8, 600.4, 510, 600.3, 601.2, 599.6, 601.1, 326, 499, 508, 489, 498, 516, 511; 294/82.18

(56) References Cited

U.S. PATENT DOCUMENTS

| | | | | |
|---|---|---|---|---|
| 2,637,088 A | * | 5/1953 | Foster | 24/598.5 |
| 3,545,049 A | * | 12/1970 | Brueggeman | 24/598.5 |
| 3,597,813 A | * | 8/1971 | Takahashi | 24/511 |
| 4,411,050 A | * | 10/1983 | Couture | 24/511 |
| 4,839,947 A | * | 6/1989 | Cohen et al. | 24/499 |

FOREIGN PATENT DOCUMENTS

| | | | | |
|---|---|---|---|---|
| GB | 0009600 | * | 6/1901 | 24/598.5 |
| GB | 0432261 | * | 7/1935 | 24/511 |

* cited by examiner

*Primary Examiner*—Victor Sakran
(74) *Attorney, Agent, or Firm*—Oyen Wiggs Green & Mutala

(57) ABSTRACT

A clip for connecting to a ring or the like has a resilient bow and first and second hook portions at first and second ends of the bow. The second hook portion has a pair of spaced apart hook parts. A hook is formed in each hook portion. The clip can be opened by squeezing the bow in a transverse direction until the first hook portion extends between the hook parts of the second hook portion with the hooks facing one another. The first hook portion extends far enough that a gap exists between the hook portions through which a ring may be inserted into the hooks. When the clip is released, the bow biases the hook portions outwardly so that the ring is captured in a loop formed by the hooks. The clip may be fabricated from resilient plastic. The clip has many uses anywhere that it is desirable to clip something to a ring or the like. The clip may be made so that it is easy to open while wearing gloves.

21 Claims, 2 Drawing Sheets

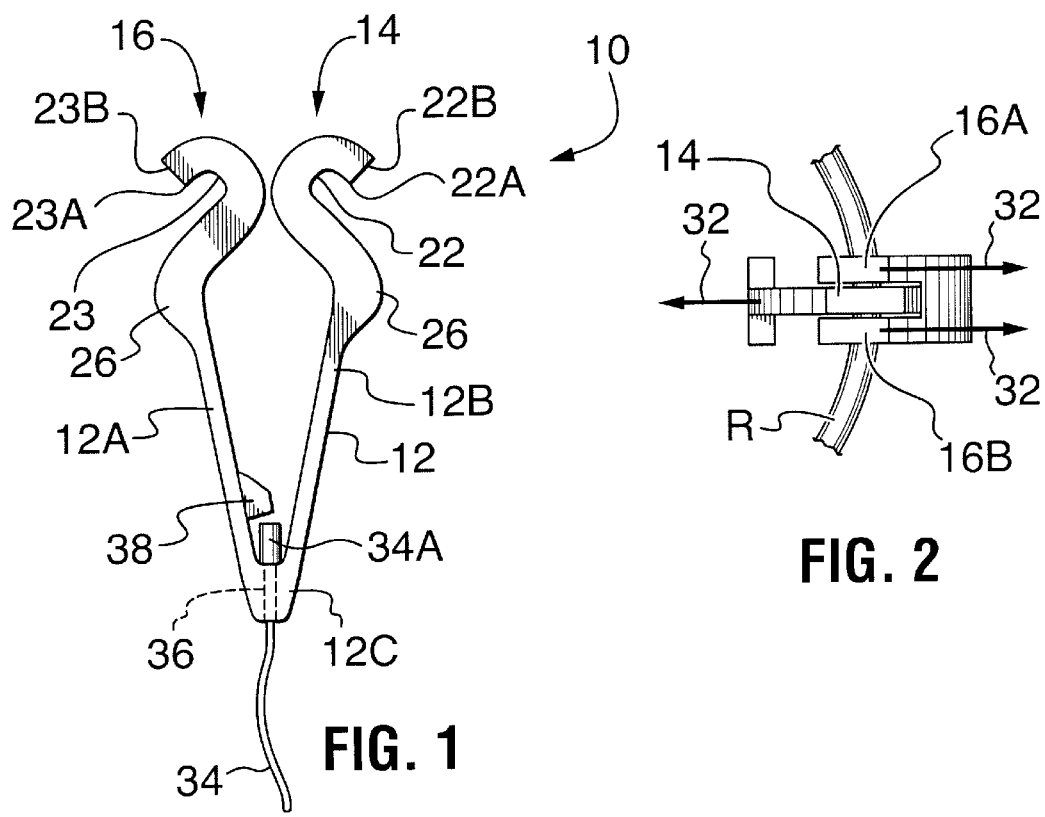
FIG. 1
FIG. 2
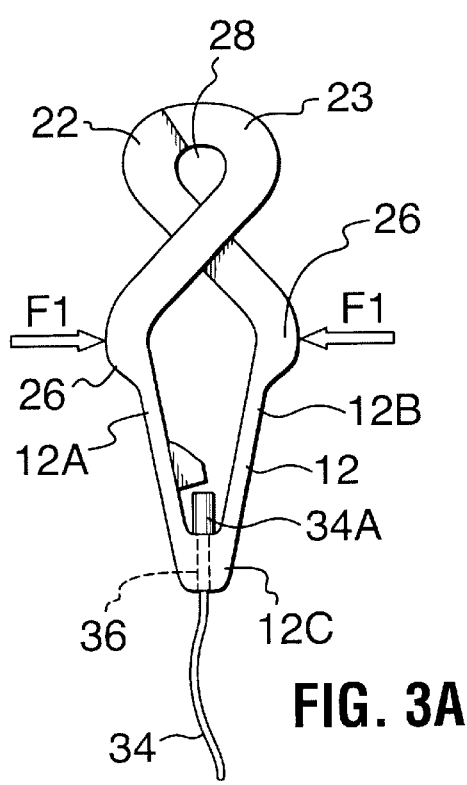
FIG. 3A
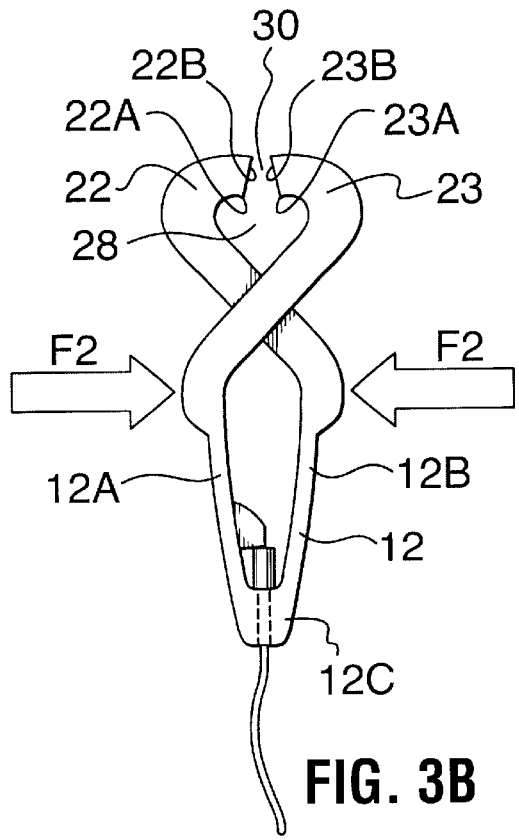
FIG. 3B

CLIP

TECHNICAL FIELD

This invention relates to clips for providing attachments to rings, lines, cord loops, bars or the like. A preferred embodiment of the invention provides a clip suitable for attaching a ski leash to a ring on a ski boot.

BACKGROUND

Some prior art clips comprise a rigid hook and a resilient leaf spring biassed against an inner portion of the tip of the hook. The leaf spring and the hook form a closed elongated loop which can be opened to receive a ring, or the like, by pressing the leaf spring inwardly. These clips can be difficult to remove, especially when wearing gloves. Many such clips are not designed to withstand pressure on the inner side of the leaf spring.

Other prior art clips comprise a rigid hook and a spring-loaded pin which is biassed into contact with the end of the hook. These clips can be undesirably expensive to manufacture since they typically include several separate pieces. Further they can be difficult to open, especially when wearing gloves. Ice build up can prevent the pin from moving freely.

There is a need for clips which can be made cost effectively and yet are durable, reliable, and easy to operate under a wide variety of conditions. There is a particular need for such clips which can be easily operated while wearing gloves.

SUMMARY OF THE INVENTION

This invention provides a clip which overcomes some of the disadvantages of the prior clips described above. Accordingly, the invention provides a clip which comprises a resilient bow having first and second ends. A first hook portion is on the first end of the bow and a second hook portion is on the second end of the bow. The second hook portion comprises a pair of spaced-apart hook parts. The first and second hook portions respectively comprise first and second hooks. The clip is resiliently deformable between an open configuration and a closed configuration. In the open configuration, the first hook portion extends between the hook parts of the second hook portion and ends of the first and second hook portions are spaced apart to define an opening. When the clip is in the closed configuration the first and second hooks form a closed loop. The bow biases the clip from its open configuration toward its closed configuration.

In preferred embodiments the clip is formed from a unitary piece of resilient plastic material. Other suitable materials could also be used. The bow preferably comprises first and second generally straight flexible cantilever arms extending from a base portion.

Further features and advantages of the invention are described below.

BRIEF DESCRIPTION OF DRAWINGS

In figures which illustrate non-limiting embodiments of the invention:

FIG. 1 is a plan view of a clip according to a preferred embodiment of the invention;

FIG. 2 is an end view of the clip of FIG. 1 engaged with a ring;

FIGS. 3A, 3B and 3C are plan views of the clip of FIG. 1 at different stages of being engaged with a ring.

Figure 3C:
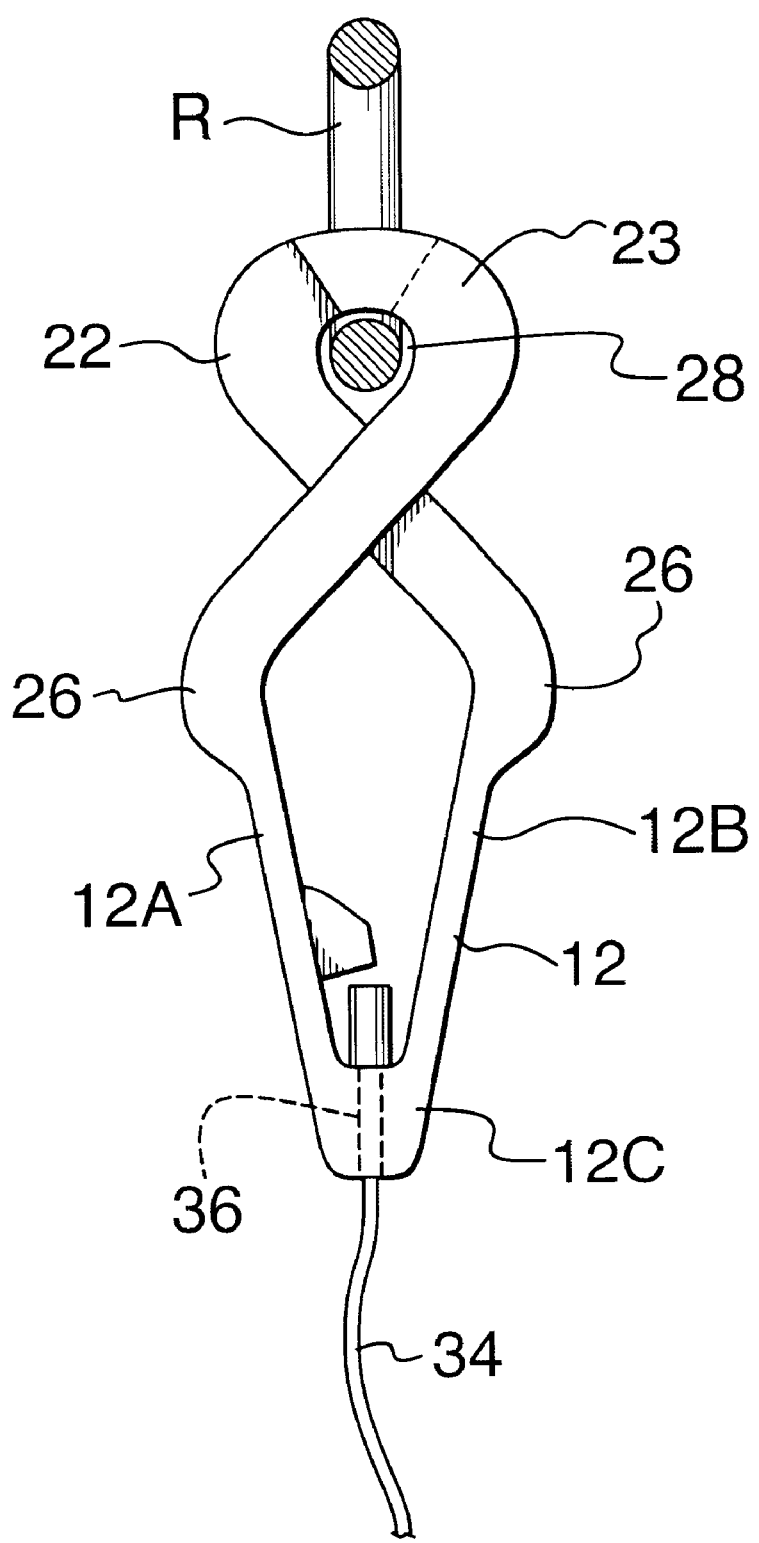

LIST OF REFERENCE NUMERALS 10 clip
12 bow portion
12A, 12B arm of bow
12C base portion of bow
14 first hook portion
16 second hook portion
16A, 16B hook parts
20 space
22 hook
23 hook
22A tip of hook 22
23A tip of hook 23
22B bevelled end portion of hook 22
23B bevelled end portion of hook 23
26 grip portion
30 opening
32 arrows
34 cable
34A expanded end of cable
36 aperture
38 block
F1 first force
F7 second force
R ring

DESCRIPTION

As shown in FIG. 1, a clip 10 has a resilient bow portion 12. A first hook portion 14 extends from a first end of the bow portion. A second hook portion 16 extends from a second end of bow portion 12. As shown in FIG. 2, second hook portion 16 comprises first and second hook parts 16A, 16B which are spaced apart by a gap 20. In the preferred embodiment, parts 16A, 16B extend parallel to one another and have generally planar faces facing gap 20. Gap 20 is capable of receiving first hook portion between hook parts 16A and 16B. Preferably gap 20 is dimensioned so that first hook portion 14 can easily pass through gap 20 with little space on either side.

Clip 10 is preferably a unitary plastic part. Clip 10 may, for example, be injection molded from polycarbonate, nylon, acetal, or another suitable resilient plastic.

Hook portions 14 and 16 each form generally U-shaped hooks 22, 23 which have tips 22A and 23A respectively. When clip 10 is in the configuration of FIG. 1, the hooks are preferably oriented to face slightly rearwardly. In the embodiment of FIG. 1, both hooks 22, 23 open rearwardly at an angle of about 45 degrees.

Bow 12 is preferably generally V-shaped. In the embodiment shown in the drawings bow 12 comprises relatively thin, flexible, cantilever arm sections 12A and 12B which extend from a thicker base portion 12C. Cantilever arm sections 12A and 12B are generally straight in the embodiment shown in the drawings. Clip 10 has an outwardly bulging grip portion 26 at each end of bow 12. The outward facing surface of clip 10 may be serrated or patterned with a series of grooves or otherwise roughened on grip portions 26.

As shown in FIG. 3A, bow 12 can be resiliently deformed inwardly by applying a first force F1 to grip portions 24. This may be done, for example, by grasping grip portions 24 between a user's fingers and squeezing inwardly. When clip 10 is in the configuration of FIG. 3A, hook portion 14 is received in overlapping relation between hook parts 16A and 16B of hook portion 16 and hooks 22 and 23 form a closed loop 28.

When a force F2 (which is greater than force F1) is applied to grip portions 26, bow 12 undergoes further elastic deformation until loop 28 opens, as shown in FIG. 3B. With clip 10 in the "open" configuration of FIG. 3B, a ring R, or the like, can be inserted into loop 28 through the opening 30 between tips 22A and 23A. Force F2 can then be removed, whereupon clip 10 returns to the configuration of FIG. 3C. Bow 12 then biases hook portions 14 and 16 outwardly as shown by arrows 32 (FIG. 2) so that ring R is captured in loop 28. When clip 10 is in the "closed" configuration of FIG. 3C, tips 22A and 23A are preferably each located slightly behind the forward end of loop 28 so that clip 10 does not tend to open when it is pulled on.

Ring R can be removed from clip 10 by squeezing grip portions 26 together, thereby returning clip 10 to the configuration of FIG. 3B. Preferably hooks 22 and 23 have bevelled end portions 22B and 23B respectively. When clip 10 is almost in its "open" configuration of FIG. 3B, and ring R is pulled outwardly, ring R wedges hooks 22 and 23 apart so that ring R can be removed from loop 28. When clip 10 is in its "open" configuration of FIG. 3B, opening 30 passes between bevelled end portions 22B and 23B and opening 30 is wider at its "proximal" end toward bow 12 and narrower at its "distal" end away from bow 12.

A tether, such as a cable or cord, is affixed to clip 10. In the illustrated embodiment, a cable 34 having an expanded end 34A passes through an aperture 36 in the bight of bow 12. In the illustrated embodiment, aperture 36 passes through base portion 12C of bow 12. An inwardly-projecting block 38 abuts expanded end 34A and thereby prevents clip 10 from sliding along cable 34.

A clip 10 has many potential applications. The clip is particularly well adapted for use in clipping a ski or snowboard leash to a boot. Clip 10 can be opened by squeezing bow 12 transversely. This may be done while wearing gloves. Clip 10 may be made from a plastic material which sheds snow and resists ice build up.

As will be apparent to those skilled in the art in the light of the foregoing disclosure, many alterations and modifications are possible in the practice of this invention without departing from the spirit or scope thereof. For example:

- The shape of bow 12 may be varied.
- Cable 34 may be attached to clip 10 in a manner other than as described above. For example, a loop of cable 34 may pass through bow 12.
- Instead of being attached to some object by way of a cord, such as a cable 34, an object such as a key ring, compass, whistle, or the like may be directly attached to clip 10.
- One part of a mating fastener, such as a buckle, snap, or the like could be attached to clip 10 so that clip 10 can be detachably affixed to a corresponding part of the mating fastener. The part of the mating fastener may be made integrally with clip 10.
- While the clip 10 illustrated in the drawings has three hook portions, clip 10 could have a larger number of interdigitating hook portions.

Accordingly, the scope of the invention is to be construed in accordance with the substance defined by the following claims.

What is claimed is:

1. A clip comprising a resilient bow having first and second ends, a first hook portion on the first end of the bow and a second hook portion on the second end of the bow, the second hook portion comprising a pair of spaced-apart hook parts, the first and second hook portions respectively comprising first and second hooks, the clip resiliently deformable between an open configuration and a closed configuration, wherein:

when the clip is in the open configuration, the first hook portion extends between the hook parts of the second hook portion and ends of the first and second hook portions are spaced apart to define an opening;

when the clip is in the closed configuration the first and second hooks form a closed loop; and, the bow biases the clip from its open configuration toward its closed configuration.

2. The clip of claim 1 wherein the clip consists of a unitary piece of a resiliently deformable material.

3. The clip of claim 1 wherein the resilient material is a plastic material selected from the group consisting of polycarbonates, nylons and acetals.

4. The clip of claim 1 wherein the bow comprises first and second flexible cantilever arms extending from a base portion.

5. The clip of claim 4 wherein the cantilever arms are generally straight.

6. The clip of claim 4 comprising an outwardly bulging grip portion on each of the cantilever arms.

7. The clip of claim 6 wherein outward facing surfaces of the outwardly bulging grip portions are roughened.

8. The clip of claim 4 comprising a cord passing through an aperture in the base portion of the bow.

9. The clip of claim 8 wherein the cord comprises a cable having an expanded end portion too large to fit through the aperture.

10. The clip of claim 9 comprising a block projecting inwardly from an inner portion of the bow, the block blocking the end portion of the cable from sliding into the bow.

11. The clip of claim 1 wherein, when the clip is in its open configuration, the opening is defined between bevelled end portions of the first and second hook portions, such that the opening is wider at a proximal end toward the bow and the opening is narrower at a distal end away from the bow.

12. A clip comprising a resilient bow having first and second ends, the first end of the bow comprising a hook portion and the second end of the bow comprising a pair of spaced apart portions, the clip resiliently deformable between an open configuration and a closed configuration, wherein:

when the clip is in the open configuration, the hook portion extends between the portions of the second end of the bow and ends of the hook portion and the portions of the second end of the bow are spaced apart to define an opening;

when the clip is in the closed configuration the hook and the portions of the second end of the bow form a closed loop; and, the bow biasses the clip from its open configuration toward its closed configuration.

13. The clip of claim 12 wherein the clip comprises a unitary piece of a resiliently deformable material.

14. The clip of claim 12 wherein the bow comprises first and second flexible cantilever arms extending from a base portion.

15. The clip of claim 14 comprising an outwardly bulging grip portion on each of the cantilever arms.

16. The clip of claim 14 comprising a cord passing through an aperture in the base portion of the bow.

17. A clip comprising a resilient bow having first and second ends, the second end comprising a pair of spaced apart portions and the first end receivable between the spaced apart portions, at least one of the spaced apart portions comprising a hook portion, the clip resiliently deformable between an open configuration and a closed configuration, wherein:

when the clip is in the open configuration, the first end extends between the spaced apart portions, and ends of the hook portion and the first end are spaced apart to define an opening;

when the clip is in the closed configuration the first end and hook portion form a closed loop; and, the bow biasses the clip from its open configuration toward its closed configuration.

18. The clip of claim 17 wherein the clip comprises a unitary piece of a resiliently deformable material.

19. The clip of claim 17 wherein the bow comprises first and second flexible cantilever arms extending from a base portion.

20. The clip of claim 19 comprising an outwardly bulging grip portion on each of the cantilever arms.

21. The clip of claim 20 comprising a cord passing through an aperture in the base portion of the bow.

* * * * *